E. L. TORSCH AND J. L. SELLAR.
OYSTER SHUCKING MACHINE.
APPLICATION FILED JUNE 28, 1918.

1,333,843.

Patented Mar. 16, 1920.
6 SHEETS—SHEET 1.

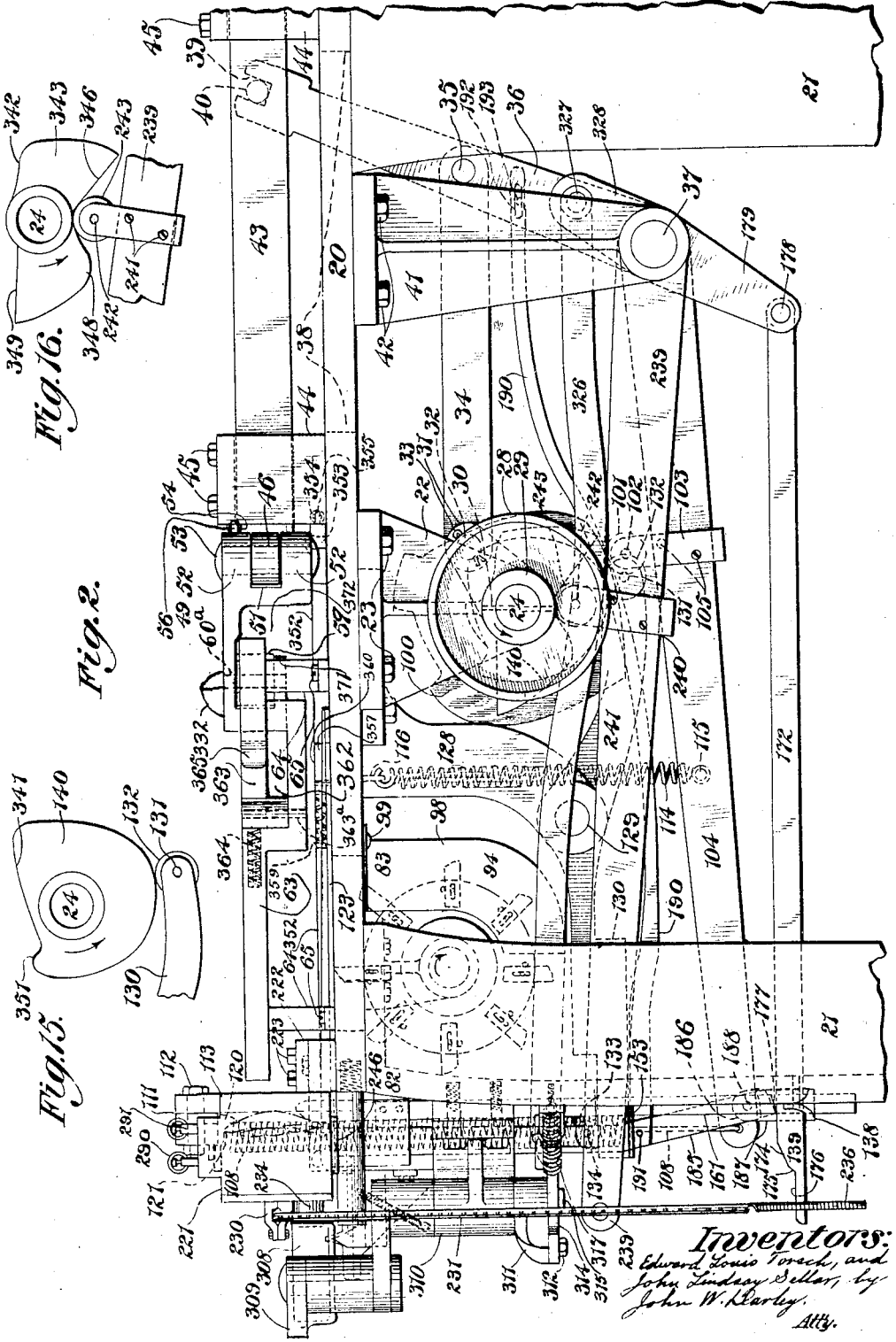

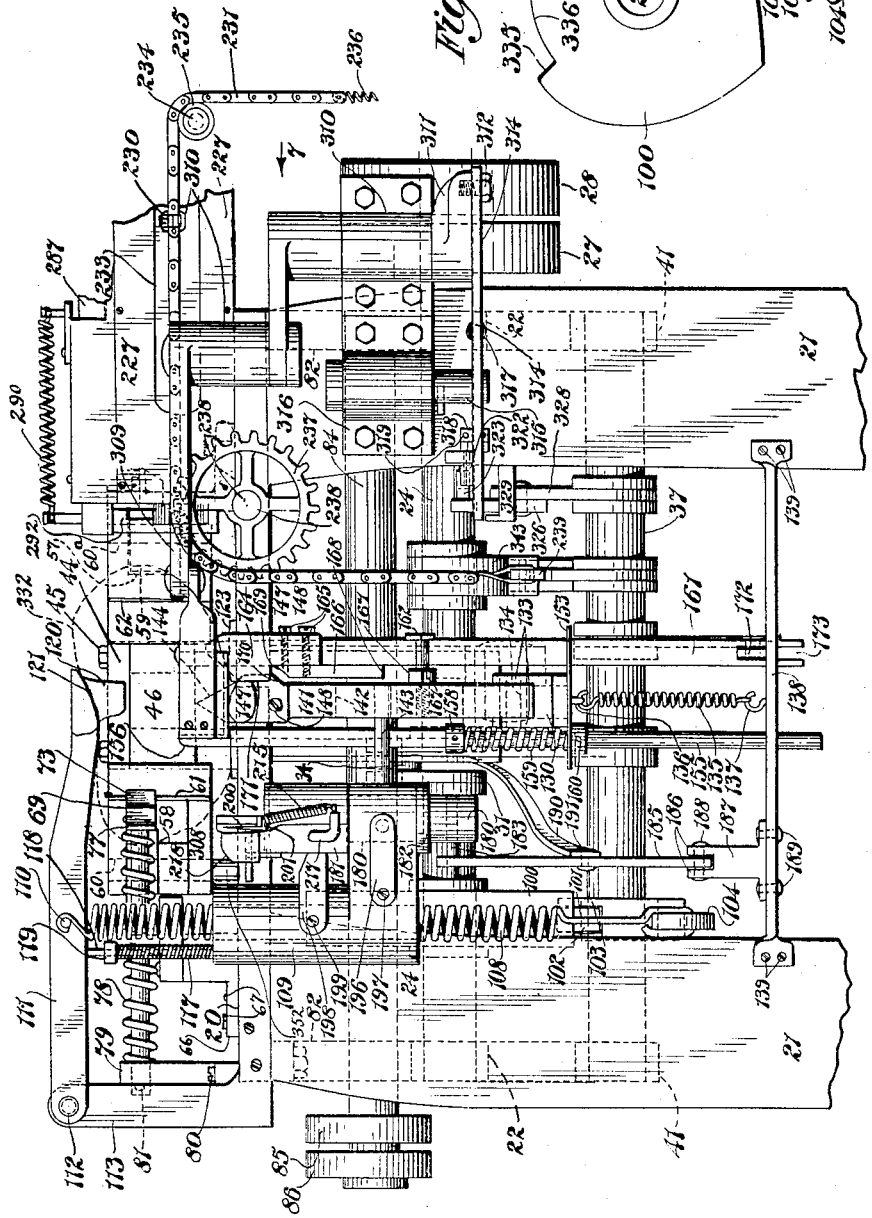

E. L. TORSCH AND J. L. SELLAR.
OYSTER SHUCKING MACHINE.
APPLICATION FILED JUNE 28, 1918.
1,333,843.
Patented Mar. 16, 1920.
6 SHEETS—SHEET 4.
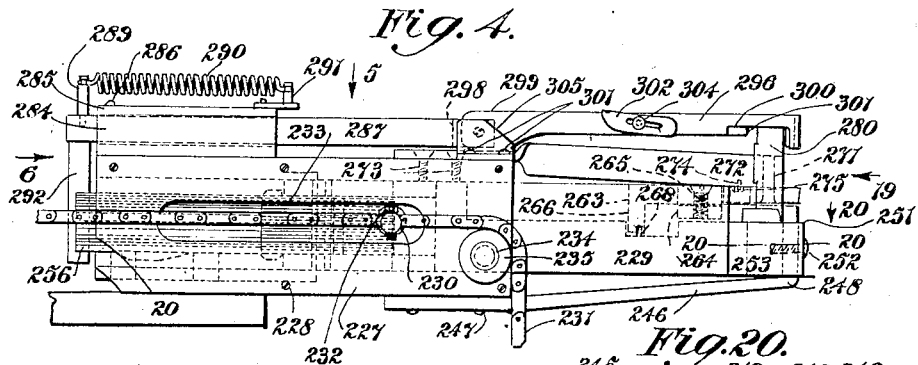
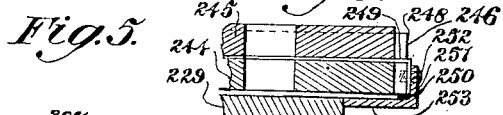
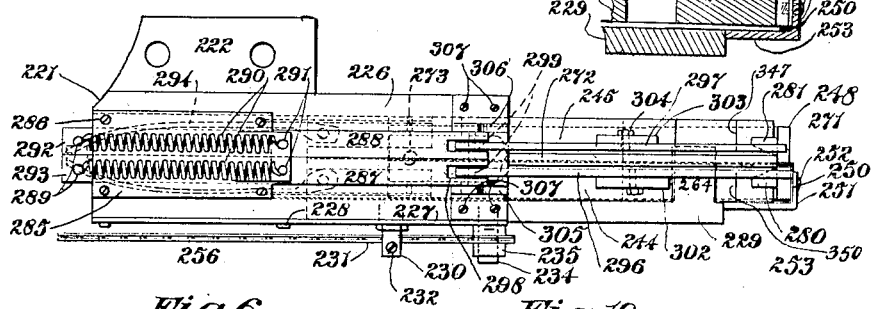
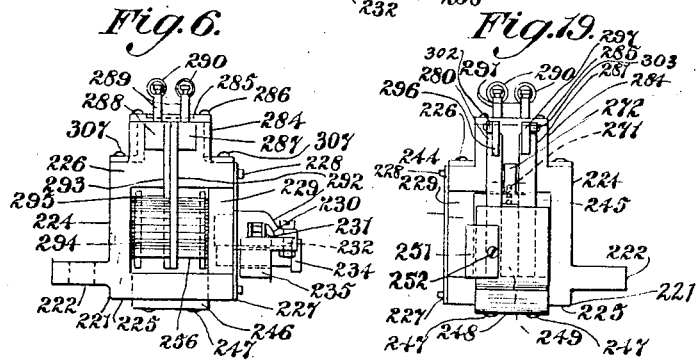
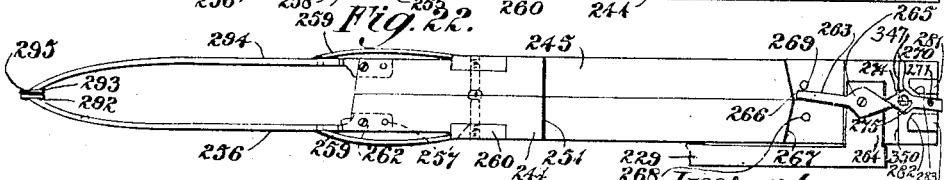

E. L. TORSCH AND J. L. SELLAR.
OYSTER SHUCKING MACHINE.
APPLICATION FILED JUNE 28, 1918.
1,333,843.
Patented Mar. 16, 1920.
6 SHEETS—SHEET 5.
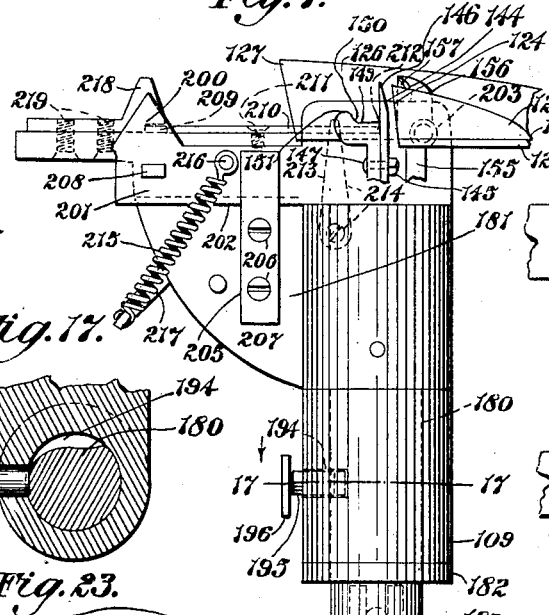
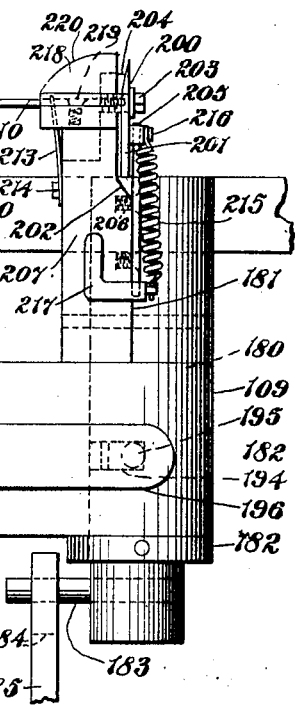
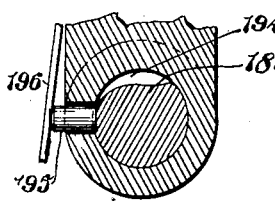
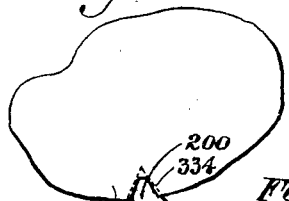
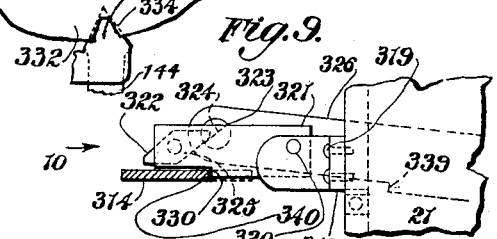
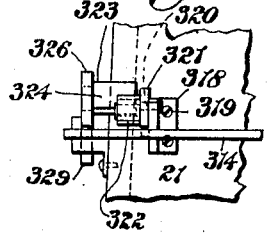
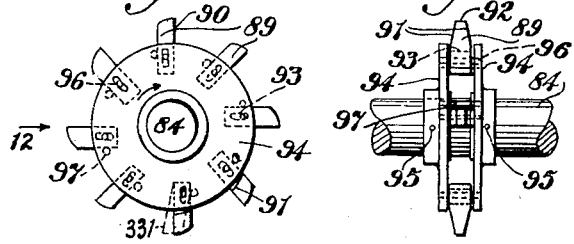
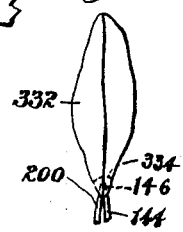
Inventors:
Edward Louis Torsch, and
John Lindsay Sellar, by
John W. Harley.
Atty.

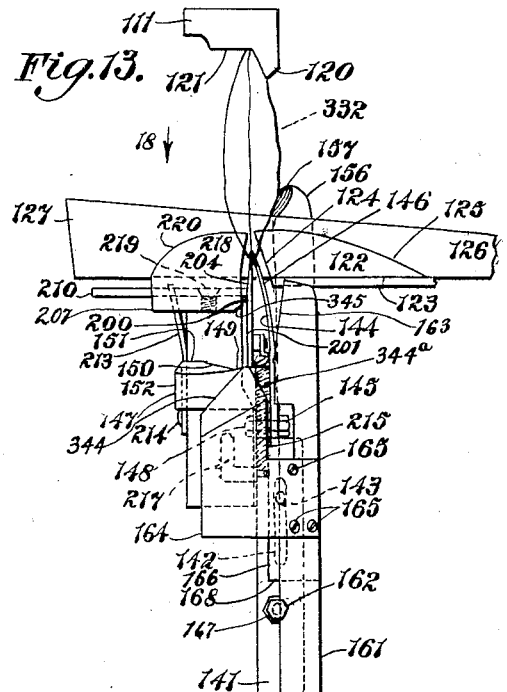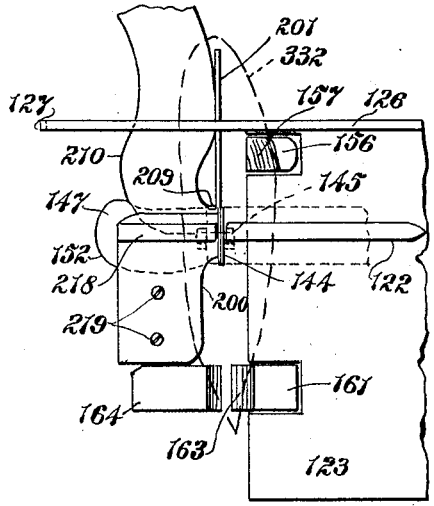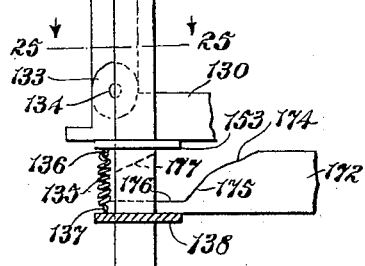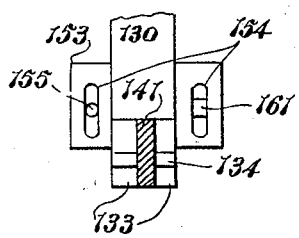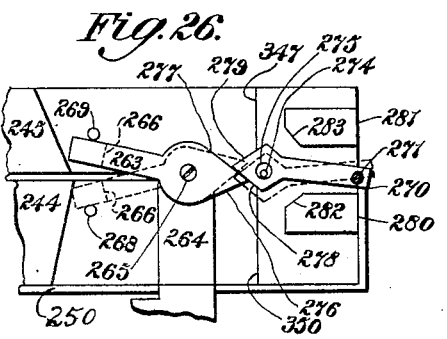

UNITED STATES PATENT OFFICE.

EDWARD LOUIS TORSCH AND JOHN LINDSAY SELLAR, OF BALTIMORE, MARYLAND.

OYSTER-SHUCKING MACHINE.

1,333,843. Specification of Letters Patent. Patented Mar. 16, 1920.

Application filed June 28, 1918. Serial No. 242,348.

*To all whom it may concern:*

Be it known that we, EDWARD LOUIS TORSCH and JOHN LINDSAY SELLAR, citizens of the United States, residing at Baltimore, in the State of Maryland, have invented certain new and useful Improvements in Oyster-Shucking Machines; and we do hereby declare the following to be a full, clear, and exact description of the invention, such as will enable others skilled in the art to which it appertains to make and use the same.

Our invention relates to oyster shucking machines.

One object of our invention is to produce an oyster shucking machine which shall require for its effective operation a minimum amount of personal attention.

A further object of our invention is to produce a machine which will automatically perform the registration of oysters of different sizes with reference to the various instrumentalities operating on the oysters during the process of shucking.

A further object of our invention is to provide a machine which will cleanly separate the oysters from the shells, discard the latter and deliver the former over a receptacle.

A further object of our invention is to provide a machine which shall be entirely automatic in its operation from the instant in which the unshucked oyster is placed in the clamp of the machine, to the completion of one cycle of operation of said machine when the shells are discarded and the oyster placed over the receptacle.

A further object of our invention is to provide a novel and efficient means for producing a notch in the shells of the oyster for the reception of opening wedges.

A further object of our invention is to combine the various instrumentalities so as to obtain a maximum of simplicity and efficiency with a minimum number of parts and at a minimum cost.

These and other objects of our invention will be adverted to in the accompanying specification and more particularly pointed out in the claims.

In the drawings:

Fig. 2 is a right hand side elevation of the machine shown in Fig. 1 looking in the direction of the arrow 2 in said figure.

Fig. 3 is a front elevation of the machine shown in Fig. 1 when viewed in the direction of the arrow 3 in said figure.

Figure 1:
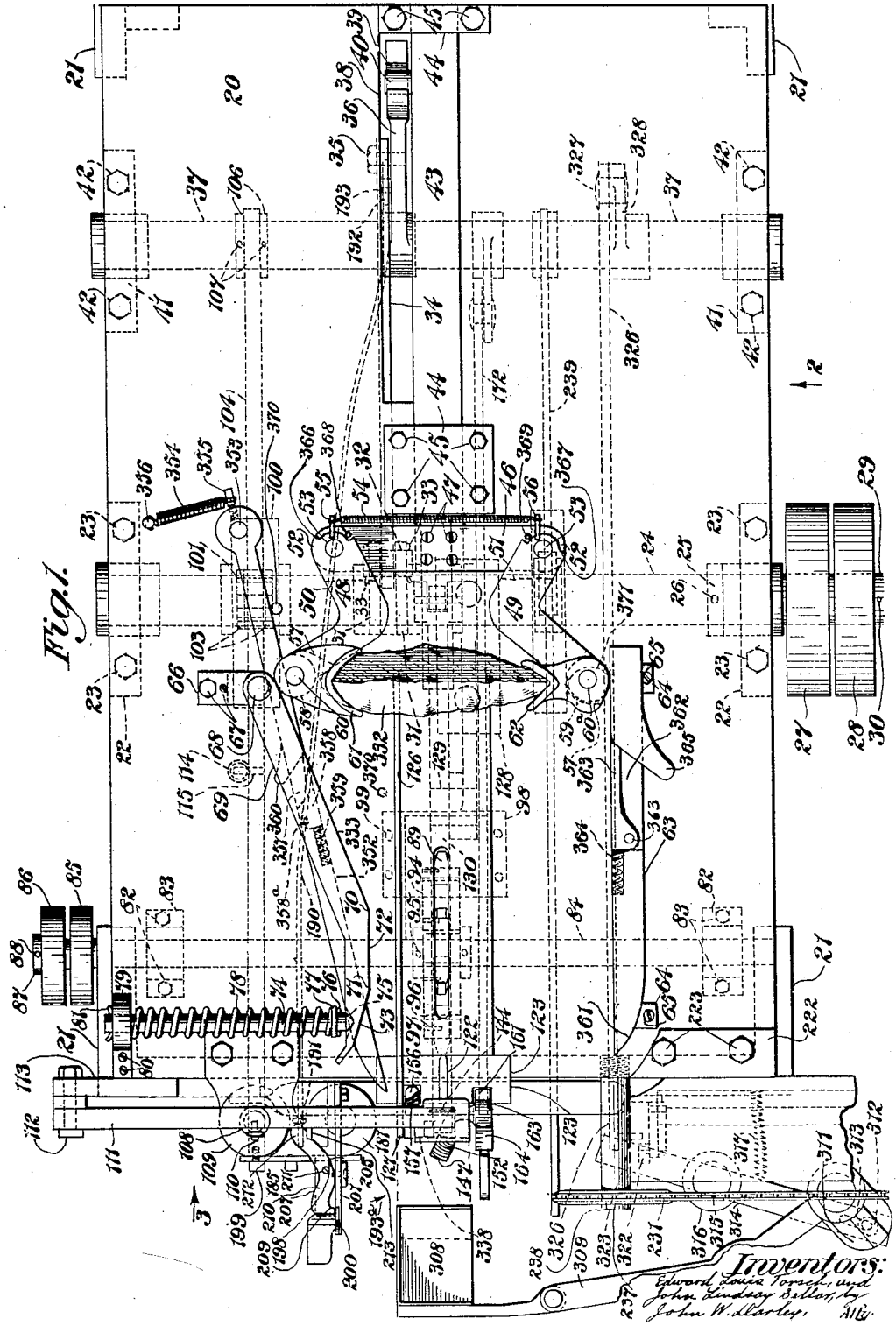
Figure 1 is a plan view of our improved machine; some of the details of the parts shown in Fig. 5 are omitted for the sake of clearness.

In Figs. 1, 2 and 3 the parts are shown in the positions they assume after the meat has been severed from the front shell of the oyster and the latter has been removed from the rear shell of the oyster.

In Figs. 2 and 3, the legs which support the table of the machine are broken away.

Fig. 4 is a front view of the shucking knives and operating mechanism therefor when viewed in the direction of the arrow 3 in Fig. 1 and showing part of the table 20.

Fig. 5 is a plan view of the shucking knives and operating mechanism therefor shown in Fig. 4 when viewed in the direction of the arrow 5 in said figure.

Fig. 6 is the left end elevation of the shucking knives and operating mechanism therefor shown in Fig. 4 when viewed in the direction of the arrow 6 in said figure.

In Figs. 5 and 6 the table 20 shown in Fig. 4 is omitted.

Fig. 7 is an enlarged detail view of one of the opening wedges when viewed in the direction of the arrow 7 in Fig. 3.

Fig. 8 is a view of the parts shown in Fig. 7 when viewed in the direction of the arrow 8 in said figure, some of the parts being omitted.

Fig. 9 is an enlarged detail view of parts hereinafter referred to.

Fig. 10 is an enlarged view of the parts shown in Fig. 9 when viewed in the direction of the arrow 10 in said figure.

Fig. 11 is an enlarged side view of the revolving hammers for hammering the notch in the oyster shells when viewed in the direction of the arrow 2 in Fig. 1.

Fig. 12 is a view of the parts shown in Fig. 11 when viewed in the direction of the arrow 12 in said figure.

Fig. 13 is a detail view of the clamping mechanism, opening wedges and coöperating parts in the positions they assume at the instant the oyster has been clamped by the vertical clamping lever and before the opening wedges have entered between the shells of the oyster.

Fig. 14 is a detail view of the cam and follower roller for operating the vertical clamping lever.

Fig. 15 is a detail view of the cam and follower roller for operating the wedge pusher bar.

Fig. 16 is a detail view of the cam and follower roller for operating the shucking knives.

Fig. 17 is a section along the line 17—17 in Fig. 7 looking in the direction of the arrow.

Fig. 18 is a view of some of the parts shown in Fig. 13 looking in the direction of the arrow 18 in said figure.

Fig. 19 is a view of some of the parts shown in Fig. 4 looking in the direction of the arrow 19 in said figure.

Fig. 20 is a partial section along the line 20—20 in Fig. 4 looking in the direction of the arrow 20 in said figure.

Fig. 21 is an enlarged side view of the front shucking knife and front shucking knife bar.

Fig. 22 is an enlarged plan view of the front and rear shucking knives and shucking knife bars.

Figs. 23 and 24 are views of the oyster after the notch has been hammered therein for the reception of the opening wedges and showing the opening wedges in place.

Fig. 25 is a section along the line 25—25 in Fig. 13 looking in the direction of the arrow.

Fig. 26 is a detail of parts hereinafter referred to.

The framework of the machine will be first described.

In the drawings:

20 represents a table which is supported by four legs 21—21—21—21. These legs may be formed integrally with the table or secured thereto in any approved manner. Brackets 22—22 are secured to the underside of the table 20 by bolts such as 23—23—23—23.

The means for holding the oyster during the hammering of the notch in the shell thereof will now be described.

In the brackets 22—22 are provided bearings in which is revolubly mounted the main shaft 24 of the machine. The main shaft 24 is prevented from longitudinal displacement in said bearings by means of the collar 25 secured thereto by the pin 26 and by the shoulder of the tight pulley 27 which is secured to the main shaft 24 in any approved manner. To the right of the tight pulley 27 a loose pulley 28 is revolubly mounted upon the shaft 24 and the collar 29 secured to said shaft by means of the pin 30 prevents displacement of the loose pulley. Any suitable form of belt shifting device is employed in order to shift the main belt from the loose pulley 28 to the tight pulley 27 when the machine is to be started.

The main shaft 24 is in two sections and on the inner ends of the sections, crank arms 31—31 are secured in any approved manner. The outer ends of said crank arms are provided with holes in which is rigidly mounted the crank pin 32, said pin being prevented from longitudinal displacement by the cotter pins 33—33. One end of the link 34 is revolubly mounted upon the crank pin 32 and the other end of said link is revolubly mounted upon a smooth shoulder portion of the screw 35 which is secured in the ram lever 36.

The ram lever 36 is rigidly secured to the lever shaft 37 and the upper end of said lever passes freely through the slot 38 in the table 20. The upper end of the ram lever 36 is provided with a driving slot 39 in which slides the ram driving pin 40. The ends of the lever shaft 37 are revolubly mounted in bearings provided on the brackets 41—41 and said brackets are secured to the underside of the table 20 by means of bolts such as 42—42—42—42.

The ram driving pin 40 is rigidly secured in the ram 43 near the rear end thereof and said ram is slidably mounted in the ram guides 44—44 which are secured to the table 20 by means of bolts 45—45—45—45—45—45. On the front end of the ram 43 the ram head 46 is secured by means of screws such as 47.

For the purpose of holding the oyster during the operation of hammering the notch in the shells thereof, the following instrumentalities are provided:

L shaped levers 48 and 49 are each provided with slots such as 50 and 51, thus forming ears such as 52—52—52—52 upon the inner ends of the L shaped levers 48 and 49. Pins such as 53—53 are rigidly secured in the ends of the ram head 46 and pass freely through holes provided within the ears 52. Thus the horizontal clamping levers 48 and 49 are articulated upon the ends of the ram head 46.

In order to give the front ends of the horizontal clamping levers 48 and 49 a normal tendency to move away from each other, the opening spring 54 is provided, one end of which is secured to the post 55 mounted in the lever 48 and the other end of which is secured to the post 56 mounted in the lever 49.

In the front end of the horizontal clamping levers 48 and 49 slots such as 57—57 are provided in which the rollers 58 and 59 are revolubly mounted upon the pins 60—60ª respectively.

The levers 48 and 49 are substantially L shaped, with the salient angles of the L's directed toward each other and at the end of the lever 48 there is provided a hardened steel U shaped clamp 61, and a hardened steel V shaped clamp 62 is provided on the end of the lever 49. These clamps are shaped substantially so as to embrace the hinged portion and the lip portion respectively of an oyster and they may be secured to the lever 48 and 49 in any approved manner.

In order to prevent the spring 54 from moving the lever 49 in a counter clock-wise direction from the position shown in Fig. 1, the fixed guide 63 is provided. The guide 63 is located so that its inner surface will contact with the roller 59 and said surface is substantially parallel to the motion of the ram 43. Each end of said guide is provided with feet 64—64 which are secured to the table 20 by means of bolts such as 65—65.

In order to move the lever 48 in a counter clock-wise direction so that the U shaped clamp 61 will be caused to embrace the hinged end of the oysters independently of the size of the oyster, the following instrumentalities are provided:

The bracket 66 is secured to the table 20 by means of bolts such as 67—67 and the upper end of said bracket carries the headed pin 68 upon which is revolubly mounted the bent lever 69. The lever 69 extends from the pin 68 forwardly and toward the center of the machine and between the points 70 and 71 it is provided with a surface 72 which is substantially parallel to the motion of the ram 43. From the point 71 to the end of the lever 69 there is a surface 73 which recedes gradually from the center of the machine.

The lever 69 is yieldingly held in the position shown in Fig. 1 by the spring pressed rod 74, the inner end of which is chamfered and fits within the countersunk hole 75 provided in the lever 69. The cotter pin 76 is secured in a hole provided in the rod 74, as shown in Fig. 1, and against this cotter pin rests the washer 77. The spring 78 is mounted upon the rod 74 between the washer portion 77 and the bracket 79. The bracket 79 is secured upon the table 20 by means of bolts such as 80 and the upper end of said bracket is provided with a hole in which the end of the rod 74 is slidably mounted. The cotter pin 81 prevents displacement of the rod 74 from said hole.

The means for hammering the notch in the shells of the oyster will now be described. Brackets 82—82 are secured to the underside of the table 20 by means of bolts such as 83—83—83—83. The hammer shaft 84 is revolubly mounted in bearings provided in the brackets 82, and near the left end of said shaft there is secured the tight pulley 85. To the left of the tight pulley 85 there is revolubly mounted upon the shaft 84 the loose pulley 86 and a collar 87 secured to the shaft 84 by means of the pin 88 prevents displacement of the loose pulley 86.

Any suitable form of belt shifting device is employed in order to shift the main belt from the loose pulley 86 to the tight pulley 85 when the hammers are to be operated. There is a plurality of hammers such as 89, each hammer being composed of hardened steel and having a flat striking face such as 90. The outer edge of each hammer is chamfered as at 91—91 and said chamfered surfaces and the surface 92 there-between form acute angles with the surface 90, as shown in Fig. 11.

Each hammer 89 is provided with a slot 93. The hammers 89 are mounted between the flanges 94—94 and said flanges are mounted upon the shaft 84 and secured thereto by means of pins such as 95—95. In the flanges 94—94, a plurality of pins such as 96 is secured, and said pins pass freely through the slots 93 in the hammers 89, and thus the hammers 89 are permitted to have a free radial movement to an extent limited by the length of the slot 93.

In order to prevent the hammers 89 from being displaced in a counter clock-wise direction, as shown in Fig. 11, a plurality of pins such as 97 is secured within the flanges 94—94.

A shield 98 of any approved size and shape is provided to partially surround the hammers, as shown in Figs. 1 and 2, in order to prevent the abraded particles of oyster shell from being thrown into the working parts of the machine in the rear thereof. The shield 98 is secured to the underside of the table 20 by screws such as 99.

In order to support the hinged end of the oyster during its movement over the hammers, a supporting rib 126 is provided which is slightly higher at the front end of the machine than at the rear end thereof and extends some distance beyond the front end of the notch rib 122. The front of the supporting rib is also cut at an angle, as shown at 127 in Fig. 13.

The means for operating the vertical clamping lever for holding the rear shell of the oyster during the process of separating the meat from the front shell, removing the front shell and removing the meat from the rear shell will now be described. The cam 100 is secured to the shaft 24 in any approved manner and the cam follower roller 101 bears against the periphery of said cam. The roller 101 is revolubly mounted upon the pin 102 and the latter is rigidly secured within the ears 103—103. Said ears are secured to the pressure lever 104 by means of screws such as 105. The rear end of the lever 104 is revolubly mounted upon the shaft 37 between the collars 106—106 and the latter are secured to said shaft by means of pins 107—107. The front end of the lever 104 is provided with a hole in which is secured one end of the extension spring 108. The spring 108 extends vertically, passes freely through a hole in the bracket 109 and the upper end of said spring is provided with an eye which is secured around the pin 110, the latter being fixed in the vertical clamping lever 111. The left end of the lever 111, (see Fig. 3), is revolubly mounted upon the bolt 112 and the latter is secured in the upper extension 113 of the table 20.

In order to hold the roller 101 in contact with the cam 100, the extension spring 114 has one of its ends attached to the pin 115 which is secured in the lever 104 and the other end of said spring is attached to the hook 116 secured to the underside of the table 20.

In order to raise the lever 111 at the proper times, the compression spring 117 is mounted upon the rod 118 between the upper face of the bracket 109 and the nut 119 threaded upon the upper end of said rod. The upper end of the rod 118 bears against the underside of the lever 111 and thus gives a normal tendency to said lever to rise when the pull of the spring 108 is relaxed, as hereinafter explained.

At the right hand end of the lever 111 there is provided a depending lip 120, which is located to embrace the rear side of the oyster, and a forward extension 121 which rests upon the top of the oyster. A rib 122 is secured upon the table 20 in any approved manner and said rib is in line with the hammers 89 so that the slot hammered in the shells by said hammers will fit over said rib. A plate 123 is formed integrally with the notch rib 122 and the front end of the rib 122 is at an acute angle to the plate 123, as shown at 124 in Fig. 13, and the rear end of said rib is curved as shown at 125 in said figures, in order to render easy the passage of the notch in the oyster shells over said rib.

The means for separating the shells so as to provide for the entrance therebetween of the shucking knives will now be described. The bracket 128 is cast integrally with the table 20 and extends downwardly from the bottom side thereof. A headed pin 129 is secured in said bracket and the lever 130 is revolubly mounted upon said pin. The rear end of the lever 130 is provided with a bearing pin 131 upon which is revolubly mounted the cam follower roller 132. The lever 130 extends forwardly and is provided at its forward end with ears 133—133 in which is rigidly mounted the pin 134. A spring 135 has its upper end attached to the ear 136 which is secured in the lever 130 and the lower end of said spring is attached to the eye 137 secured in the brace 138. The brace 138 extends between and is secured to the front legs 21—21 by screws such as 139. The spring 135 serves to keep the roller 132 in contact with the cam 140. The lower end of the wedge pusher bar 141 is revolubly mounted upon the pin 134 and said bar is provided with a slot 142 in which slides freely the pin 143. The pin 143 is secured in the bracket 109 and the upper end of the wedge pusher bar is thus guided by said pin. To the upper end of the wedge pusher bar 141, the rear wedge 144 is secured by means of the bolt 145. The wedge 144 is approximately triangular in shape as shown in Fig. 3 and the rear edge thereof is chamfered off as shown at 146 in Figs. 7, 13 and 24. The front wedge lifter 147 is secured to the wedge pusher bar 141 by means of the bolt 148. The wedge lifter 147 has a flat surface 149 that is substantially at right angles to the pusher bar 141 and a flat surface 150 that forms an obtuse angle with the surface 149. There is also a flat surface 151 at the top of the lifter 147 that is parallel with the surface 149. The sides of the lifter 147 are curved as at 152 to conform to the locus of the front wedge when the same is moved outwardly, as hereinafter explained.

A plate 153 is secured to the lower side of the lever 130 near the front thereof in any approved manner. Said plate is provided with a pair of slots such as 154, (see Fig. 25), and the rear support rod 155 which is circular in cross section passes freely through the left hand one of said slots. The lower end of said rod is slidably mounted in a hole provided in the brace 138 and the head 156 of said rod is slidably mounted in a slot provided in the plate 123, as shown in Figs. 1 and 18, and said rod is prevented from moving forwardly out of said slot by the pin 143. The upper end of the rod 155 is provided with a head 156 that is rectangular in cross section and beveled as at 157 in order that the beveled surface may approximately conform to the curvature of the rear shell of the oyster. A collar 158 is secured to the rod 155. A compression spring 159 is mounted upon the rod 155 between said collar and the plate 153 and serves to keep the collar 160, which is also secured to the rod 155, normally against the underside of the plate 153.

The rear shell holding bar 161 is square in cross section and passes freely through the right hand slot 154 in the plate 153. The lower end thereof is slidably mounted in a hole provided in the brace 138 and the upper end of said bar slides freely in a slot provided in the plate 123. The upper end of the bar 161 is prevented from moving forwardly out of the slot in the plate 123 by the bolt 162 which is secured in the pusher bar 141. The upper end of the bar 161 is rectangular in cross section and is beveled as at 163 in order to conform to the curvature of the rear shell of the oyster. In order to hold the front side of the rear shell while the meat is being removed therefrom, the finger 164 is secured to the bar 161 by means of bolts 165—165—165. The plate 166 is also secured to said bar by said screws. A nut 167 is mounted upon the bolt 162 adjacent to the pusher bar 141 so as to strike the lower edge of the plate 168 during the operation of the machine, as hereinafter explained. The upper edge of said plate is beveled as at 169 so as to strike the lower beveled edge 170 of the wedge 144 during the operation of the machine, as hereinafter explained. The upper end of the finger 164 is extended slightly toward the left in order to overlie the front of the wedge 144 and serves to guide same as shown at 171 in Fig. 3.

In order to additionally control the movement of the holding bar 161, the controlling pusher rod 172 is slidably mounted in the slot 173 formed in the lower end of the bar 161. The pusher rod 172 is provided at its forward end with two angularly disposed surfaces 174 and 175 and with a straight extension 176. The top of the slot 173 is beveled as shown at 177 in Figs. 2 and 13 in order to coöperate with the angularly disposed surfaces 174 and 175, as hereinafter explained. The rear end of the rod 172 is revolubly mounted upon the pin 178 and the latter is secured to the arm 179, said arm being rigidly secured to the shaft 37.

The means for operating the front wedge will now be described. The bracket 109 carries at its right end a vertical bearing hole in which is revolubly mounted the reduced cylindrical bearing portion 180 of the front wedge arm 181. The collar 182 secured in any approved manner to the lower end of the portion 180 serves to prevent vertical displacement of the arm 181. A pin 183 is secured in the portion 180 below the collar 182 and a slot 184 in the upper end of the lever 185 embraces said pin and serves to give the arm 181 a movement such as to rotate the front wedge 200 through about a quadrant from the position shown in Figs. 1 and 2 to the position shown in Figs. 13 and 18, and vice versa, as hereinafter described.

The lower end of the lever 185 fits loosely between the ears 186 of the bracket 187 and is revolubly mounted upon the pin 188 secured in said ears. The bracket 187 is secured to the brace 138 by rivets such as 189. The link 190 has its forward end revolubly mounted upon the pin 191 and the latter is secured in the lever 185, as shown in Fig. 3. The rear end of the link 190 is provided with a slot 192 in which fits loosely the headed pin 193 and the latter is secured in the ram lever 36, as shown in Fig. 2.

In order to give the front wedge 200 a tendency to move toward the position shown in Figs. 13 and 18, after it has been slightly revolved in the direction of the arrow 193ª from the position shown in Fig. 1, the bearing portion 180 is provided with a slot 194, that is eccentrically disposed with reference to the center of the portion 180, as shown in Fig. 17. A pin 195 passes freely through a hole in the bracket 109 and its inner end rests within the slot 194. One end of the spring 196 bears against the outer end of the pin 195 and the other end of said spring is secured to the bracket 109 by a bolt 197. The arm 181 is stopped in its outward movement by the stopping piece 198 which is secured to the bracket 109 by a bolt 199.

The front wedge 200 is formed integrally with the lever portion 201, the lower edge of which rests upon the bottom of the rabbet 202 formed in the top inner face of the arm 181. The front wedge 200 is substantially triangular in profile, as shown in Fig. 7, and the front side thereof is beveled as at 204. The lever portion 201 has a limited clockwise movement from the position shown in Fig. 7 and slides freely between the inner face of the offset 207 of the arm 181 and the inner face of the guide 205 which is secured to said arm by screws such as 206. The lever portion 201 is provided near its front end with a rectangular hole 208 which is adapted to receive the nose 209 of the lever 210 during the operation of the machine, as hereinafter explained.

The lever 210 is revolubly mounted upon the screw 211 which is secured in the top of the offset 207 and the end 212 of said lever is shaped and located to strike the bracket 109 when the parts are as shown in Fig. 1 and remove the nose 209 from the hole 208.

A spring 213 (see Fig. 1), secured to the offset 207 by the screw 214 bears at its upper end against the inside of the end 212 of the lever 210 and serves to press the nose 209 toward the wedge 200. The front wedge 200 is normally kept in the position shown in Figs. 7, 8 and 13 by the spring 215, one end of which is attached to the pin 216, the latter being secured in the lever portion 201. The other end of the spring 215 is attached to the arm 217 and the latter is secured in the offset 207. The front notch rib 218 is formed of hardened steel and secured to the offset 207 by screws such as 219—219. The rib 218 is of substantially the same shape in cross section as the rib 122 and the front end of the former rib is rounded as shown at 220 in Figs. 8 and 13. The ribs 122 and 218 are in alinement with each other as shown in Figs. 13 and 18.

The means for separating the meat from the front and rear shells of the oyster will now be described.

The shucking knife housing 221 is provided with a flange 22 which rests upon the top of the table 20 and is secured thereto by means of bolts 223. The back 224, bottom 225, top 226 of the housing 221 are formed integrally with the flange 222. (See Figs. 5 and 6.) The front of the housing 221 is closed by the plate 227 which is secured to the bottom 225 and top 226 by screws such as 228. In the rectangular space between the inside surfaces of the back 224, the bottom 225, the top 226 and the plate 227, there is slidably mounted the shucking knife driver bar 229. A stud 230 is secured in the bar 229 in any approved manner and said stud is provided with a slot through which passes the sprocket chain 231 and said sprocket chain is fixed in position in said stud by means of the clamping screw 232. The stud 230 projects through the slot 233 provided in the plate 227. Near the right hand lower corner of the plate 227 the stud 234 is secured in any approved manner, the roller 235 is revolubly mounted thereupon, and the sprocket chain 231 passes over said roller and thence downwardly and is connected to the upper end of the spring 236, the lower end of said spring being attached to the floor or some part of the framework of the machine.

The sprocket chain 231 extends toward the left from the stud 230 (see Fig. 3), and passes over the sprocket wheel 237 which is revolubly mounted upon the stud 238, and the latter is secured in any approved manner in the front edge of the table 20. At the lower end, the chain is connected to the front end of the shucking lever 239 and the rear end of said lever is revolubly mounted upon the shaft 27. Two ears, one of which is shown at 240, are secured to the lever 239 by means of screws such as 241 and they rigidly support at their upper ends the pin 242, and the cam follower roller 243 is revolubly mounted upon said pin between said ears.

The front shucking knife bar 244 and the rear shucking knife bar 245 are also slidably mounted in the rectangular space between the inside surfaces of the back 224, bottom 225, top 226 and plate 227, together with the shucking knife driver bar 229, as shown most clearly in Figs. 5 and 19.

The brace 246 is secured to the bottom by screws such as 247; the left end of said brace is upturned as at 248 and is provided with a slot 249, (see Figs. 19 and 20), and the thin steel liner 250, substantially U shaped in cross section, has one of its limbs passing through said slot and rests between the bars 244 and 245, and the other limb rests between the bars 229 and 244, and the bottom of the U is clamped between the knee piece 251 and the upturned portion 248 by means of the screws 252. The end of the front leg 253 of the knee piece 251 serves as a stop for the bar 229 when the latter is pulled toward the right by the spring 236. The liner 250 is inserted between the bars as just described for the purpose of preventing communication of movement from one bar to another. The upturned end 248 also serves as a stop to limit the movement of the bars 244 and 245 toward the right.

The front shucking knife bar 244 is cut away as at 254 in order to provide clearance for the arm 264 which is formed integrally with the shucking knife driver bar 229. The front of the bar 244 is slotted and in said slot, between the ears 255, a plurality of thin shucking knives 256 is revolubly mounted upon the pin 257. The lowest knife of said plurality of knives is made somewhat thicker than the rest and said knife and the top knife are each provided with extensions 258—258. A plurality of springs 259 bears at one end against the outside of the knives 256 and the other ends of said springs are secured in any approved manner in the spring block 260 which is secured to the bar 244 by screws such as 261. The extensions 258 are added to the bottom and top knives in order to insure that the ends of the top and bottom springs will not slip off said knives. A spring 262 is mounted in a hole provided in the top ear 255 and the lower end of said spring bears against the top one of the knives 256 and serves to keep said knives pressed together.

The dog 263 is revolubly mounted upon the screw 265 and the latter is threaded into the arm 264. The lower end 266 of the dog 263 moves freely in the slot 267 provided in the bar 244.

There is a slot similar to 267 in the bar 245 and said bar is also provided with a recess similar to 254 and provided with shucking knives 294, springs 259, &c. in all respects similar to those described with reference to the bar 244, except that the shucking knives, springs and ears are reversed in position, as shown in Fig. 22. Pins such as 268 and 269 mounted respectively in the bars 244 and 245 serve to limit the amplitude of swing of the end 266 of the dog 263. A pawl 270 is revolubly mounted upon the screw 271 and the latter is threaded into the right end of the arm 272, the left end of the arm 272 is secured by means of screws 273 to the top of the shucking knife housing 221. A pin 274 secured in the arm 272 and extending into the hole 275 provided in the front end of the pawl 270 serves to limit the movement of said pawl. The dog 263 is provided at its right hand end with two faces 276 and 277 forming acute angles with each other. The pawl 270 is provided at its left hand end with two faces 278 and 279 forming acute angles with each other. The bars 244 and 245 are provided respectively at their right hand ends with vertical extensions 280 and 281. These extensions are sufficiently far apart to permit the operation of the pawl 270 therebetween, as hereinafter explained.

The left hand side of the extensions 280 and 281 are provided with faces respectively 282 and 283 forming acute angles with the sides of said extensions.

The guide 284 is formed integrally with the top 226 of the housing 221 and the top of said guide is closed by the plate 285 secured thereto by screws such as 286. Shucking knife guide bars 287 and 288 are slidably mounted within the guide 284. Pins such as 289—289 are fixed in the left end of the bars 287 and 288 and extension springs 290—290 have one end secured to one of said pins and the other ends of said springs are secured to the pins 291—291 which are supported by the plate 285; the springs 290 serve to keep the bars 287 and 288 normally in the positions shown in Figs. 4, 5 and 6.

Downward extensions 292 and 293 are secured respectively to the left ends of the bars 287 and 288 and said extensions normally rest between the points of the shucking knives 256 and 294. The extension 293 is beveled as shown at 295 in Figs. 6 and 22 for a purpose hereinafter explained.

Detents 296 and 297 are revolubly mounted in slots such as 298 formed in the right hand end of the bars 287 and 288 and upon pins such as 299. The right hand ends of the detents 296 and 297 are provided respectively with slots 300 and 301, and it will be noted by reference to Fig. 4 that the slot 301 is somewhat shorter than the slot 300. Lifting fingers 302 and 303 are secured respectively to the detents 296 and 297 by screws such as 304, and said detents are arranged to strike respectively the inclines 305 and 306 during the operation of the machine, as hereinafter described. Said inclines are secured to the top 226 by screws such as 307.

The means for receiving the meat after the same has been completely severed from both shells of the oyster will now be described. The pan 308 is secured in any approved manner to the arm 309 and the latter is provided with a bearing portion which is revolubly mounted in the bracket 310 which is secured in any approved manner to the framework of the machine. The lever 311 is secured in any approved manner to the lower end of the bearing portion of the arm 309. A screw 312 is secured in the lever 311; said screw slides freely in the slot 313 provided in the lever 314. The lever 314 is provided with a bearing stud 315 which is revolubly mounted in the bracket 316 secured in any approved manner to the framework of the machine. A compression spring 317 serves to keep the lever 314 and pan 308 in the position shown in Figs. 1, 2 and 3. The left end of the lever 314 rests adjacent to the bracket 318 which is secured to the right hand front leg 21 as by the screws 319. The bracket 318 carries a headed pin 320 upon which is revolubly mounted the dog 321. A lozenge shaped tappet 322 is secured in any approved manner to the dog 321 and said tappet is arranged in the path of the pin 323. The pin 323 is provided with a face 324 adapted to strike the face 325 of the tappet 322, as hereinafter explained. The pin 323 is rigidly secured in the front end of the link 326 and the other end of said link is revolubly mounted upon the pin 327 secured in the end of the arm 328, the latter being rigidly secured to the shaft 37. The front end of the link 326 is guided by the guide 329, the latter being secured to the right hand front leg 21 of the machine.

The dog 321 is provided with a notch 330 adapted to lock the lever 314, as shown in Fig. 9, during the operation of the machine, as hereinafter explained.

In order to insure that the horizontal clamping levers 48 and 49 will clamp the oyster 332 until the vertical clamping lever 111 has clamped the same, the following instrumentalities are provided:—

The releasing lever 352 is pivotally mounted upon the pin 353 and the latter is secured to the table 20 in any approved manner. An extension spring 354 is secured at one end to the eye 355 mounted in the lever 352 and its other end is secured to the post 356 which is mounted in the table 20 in any approved manner. The spring 354 serves to press the inner surface of the lever 352 normally against the lower end of the pin 60 which extends below the bottom of the lever 48. The lever 352 is also placed below the bottom of the lever 48 so that it has no contact with any part of said lever excepting the extension of the pin 60, as hereinbefore noted.

The lever 352 is slotted as at 357 and said slot is closed on the inside by the dog 358 which is revolubly mounted upon the pin 358ª and normally kept in the position shown in Fig. 1 by the spring 359. A wing 360 is provided on the outer side of the lever 352 adjacent to the slot 357.

The front of the guide 63 is rounded as at 361 and said guide is provided with a slot 362 which is normally kept closed by the dog 363, which is revolubly mounted upon the pin 363ª and normally kept in the position shown in Fig. 1 by the spring 364. A wing such as 365 is formed upon the guide 63 adjacent to the slot 362.

The operation of our improved oyster shucking machine is as follows:—

Power is to be applied to the pulley 85 in any approved manner. This will revolve the flanges 94 in the direction of the arrow in Fig. 11. The revolution of the flanges 94 and the hammers 89 will cause the latter to assume the position shown dotted at 331 in Fig. 11 under the influence of centrifugal force thereupon.

Power is then to be applied to the pulley 27 in any approved manner in order to revolve the shaft 24 in the direction of the arrow in Fig. 2. The revolution of the shaft 24 will give the crank pin 32 a motion of revolution and said motion communicates a "to and fro" motion to the link 34. The link 34 communicates a swinging motion to the ram lever 36 and the latter, through the intermediary of the ram driving pin 40, causes the ram 43 to move from the position shown in Figs. 1, 2 and 3 toward the front and back again, and so on continuously as long as power is applied to the pulley 27.

While the ram 43 is moving as just described and when it is about in the position shown in Figs. 1, 2 and 3, an oyster 332 is to be placed between the clamps 61 and 62, with the hinged portion of said oyster directed toward the clamp 61 and the lip portion of said oyster directed toward the clamp 62. As the ram 43 moves toward the front, the roller 58 strikes against the face 333 of the lever 69 and the clamp 61 is forced toward the clamp 62, (see Fig. 1), embracing the hinged portion of the oyster 332 and forcing the lip portion within the clamp 62. The clamp 62 is prevented from moving farther toward the right than the position shown in Fig. 1 by reason of the fact that the roller 59 bears against the face of the fixed guide 63. Further forward motion of the ram 43 toward the front brings the oyster over the hammers 89 and the latter hammer a notch 334 therein, as shown in Fig. 23.

As the ram moves forward as just described, the cam 100 is turning in the direction of the arrow in Fig. 14 and just before the ram reaches the limit of its forward motion the face 335 of said cam passes to the right of the roller 101 and the spring 114 brings said roller into contact with the face 336. The spring 117 then lifts the vertical clamping lever 111 so that the oyster 332 can be placed beneath said lever. During the forward motion of the oyster 332, the notch 334 embraces the ribs 122 and 218. Further motion of the shaft 24 brings the face 337 against the roller 101 and forces said roller downwardly, thus causing the front end of the lever 104 to pull downwardly upon the spring 108 and bringing the lip 120 down behind the oyster and the forward extension 121 down on top of the oyster to clamp it in place.

It is to be noted that the front end of the guide 63 and the releasing lever 352 are extended sufficiently far toward the front so that the former will not release the roller 59 and the latter will not release the pin 60 until after the vertical clamping lever 111 has clamped the oyster 332.

After the guide 63 and the lever 352 release respectively the roller 59 and the pin 60, the spring 54 moves the front end of the levers 48 and 49 rapidly away from each other until the noses 366 and 367 respectively strike the pins 368 and 369. At the same time the lever 352 will be moved in a counter clock-wise direction by the spring 354 until the inner face of said lever strikes the pin 370. It is to be noted that the spring 354 is sufficiently strong to overcome the tendency of the spring 54 to move the lever 48 in a clock-wise direction until after the pin 60 has been removed from the end of the lever 352. When the ram 43 moves backwardly, as hereinafter explained, the roller 59 will move backwardly on the outside of the guide 63 until it strikes the wing 365 and then said roller will pass through the slot 362 causing the dog 363 to move against the pressure of the spring 364 until the ram 43 reaches the position which it occupies in Fig. 1, and then the dog 363 moves to close the slot 362 so that when the ram 43 again moves forward, the roller 59 will be forced to move forwardly on the inside of the guide 63.

It is to be noted that the lower side of the lever 49 where it surrounds the pin 60ª is curved as at 371 to a smaller radius than the curve at the top of said lever surrounding said pin, thus providing a slot 372 shown in Fig. 2 to clear the guide 63. When the ram 43 moves backward, as hereinafter described, the lower end of the pin 60 will move backwardly on the outside of the lever 352 until it strikes the wing 360 and then said pin will be forced through the slot 357 moving the dog 358 in a clock-wise direction until said pin passes out of said slot on to the inner face of the lever 352. When the ram 43 reaches the position shown in Fig. 2, the dog 358 will close the slot 357 under the pressure of the spring 359 and then when the ram 43 moves forwardly again, the bottom of the pin 60 will be on the inside of the lever 352.

The dog 358, spring 359, slot 357 and wing 360 are similar respectively to the dog 363, spring 364, slot 362 and wing 365.

Just before the oyster 332 is carried over the hammers 89, the face 324 of the pin 323 strikes the face 325 of the tappet 322 and lifts the notch 330 from the path of the lever 314, thus permitting the spring 317 to move the inner face 340 of the lever 314 to the position shown dotted in Fig. 9. This motion of the lever 314 brings the inner face of the pan 308 into the position shown dotted at 338 in Fig. 1, with its inner face in contact with the face 127 of the rib 126. Just before the ram 43 reaches the limit of its forward movement, the notch 339 of the link 326, (see Fig. 9), strikes the face 340 of the lever 314 and thus moves the pan 308 from the position shown dotted at 338 in Fig. 1 in a counter clock-wise direction to a position somewhat beyond the position shown by full lines in said figure.

While the pan 308 is moving as just described, the link 190 moves the lever 185 forwardly and the upper end of said lever operating against the pin 183 turns the front wedge arm 181 and offset 207 in a counter clock-wise direction, (see Fig. 1), this motion of said arm being accelerated by the pressure of the spring 196, (see Fig. 17,) which is applied to the eccentric bottom of the slot 194 through the pin 195, in order to bring the wedge 200 into the operating position and rib 218 into the position shown in Fig. 13, for the purpose of aiding in the support of the lower side of the oyster, as hereinbefore explained.

Just after the lever 111 has clamped the oyster, the face 341 of the cam 140, (see Fig. 15), strikes the roller 132 and moves the rear end of the lever 130 downwardly, thus pushing up the rear support rod 155 so that the head 156 thereof rests behind the rear shell of the oyster under the pressure of the spring 159.

It is to be noted that when the rear end of the lever 130 is pushed downwardly, the front end thereof is raised and the plate 153 bearing against the underside of the spring 159 raises the rod 155, as just described. The plate 153 is raised against the pull of the spring 135. As the front end of lever 130 rises, the wedge pusher bar 141 is also pushed up. As the bar 141 moves upwardly the flat surface 149 of the front wedge lifter 147 strikes the lower edge of the lever portion 201 of the front wedge 200, (see Fig. 7), and the rear wedge 144 and the front wedge 200 are moved upwardly to enter between the shells of the oyster, as shown dotted in Figs. 23 and 24.

During the upward motion of the bar 141, as just explained, the nut 167 strikes the edge 168 of the plate 166 and moves the rear shell holding bar 161 upwardly, thus bringing the bevel 163 at the upper end thereof behind the rear shell of the oyster.

As the ram 43 commences its backward motion and while the bar 141 is rising, the pan 308 is moved in a clock-wise direction into the position shown by full lines in Fig. 1.

When the ram 43 begins its backward motion, the face 342 of the cam 343 strikes the roller 243 and moves the lever 239 downwardly. The front end of said lever then pulls upon the sprocket chain 231 and moves the bar 229 toward the left. At the beginning of said motion, the end 266 of the dog 263 is in the position shown in Fig. 22 and as the bar 229 moves toward the left it drives the bar 245 and the shucking knife 294 secured thereto in the same direction. At the same time, the extension 281 drives the detent 297 and the shucking knife guide bar 288 in the same direction. By the time the front shucking knife 294 is moved a short distance toward the left the opening wedges 144 and 200 have been raised to their full height, introduced between the oyster shells and the upward movement of the finger 164 has brought the incline 344 on the upper face thereof against the incline 345 on the lower edge of the offset 207, (see Fig. 13), and forced the front wedge 200 away from the rear wedge 144, thus separating the lips of the shells for the introduction of the rear shucking knife 294 therebetween.

When the nut 167 strikes the edge 168 it moves the bar 161 sufficiently high to bring the beveled portion 163 in the rear of the rear shell of the oyster. As the ram 43 continues its rearward motion, the angular surface 175 on the rod 172 strikes the top 177 of the slot 173 and raises the bar 161 a short distance while the front wedge 200 is moving outwardly. After the front wedge 200 has moved sufficiently far toward the front, the surface 174 comes into contact with the surface 177 and raises the bar 161 sufficiently high to bring the inner surface 344$^a$ of the finger 164 in contact with the inside face of the rear shell of the oyster, thus serving with the bevel 163 of the bar 161 to clamp the rear shell of the oyster.

While the wedges are holding the lips of the oyster apart, the rear shucking knife 294, the bar 288 and the detent 297 continue to move toward the left. The left end of the lifting finger 303 strikes the incline 306 and thus releases the left end of the slot 301 from the top of the extension 281. Then the corresponding spring 290 brings the bar 288 and downward extension 293 rapidly to the position shown in Fig. 4.

The shucking knife 294 near the limit of its movement toward the left severs the meat from the front shell of the oyster. The pin 193 strikes the rear end of the slot 192 in the link 190 and pulls the latter rapidly toward the rear, thus moving the upper end of the lever 185 inwardly, (see Fig. 8), and turning the offset 207 in a clock-wise direction, as shown in Fig. 1, and moving said offset and front wedge 200 rapidly to the position shown in Fig. 1, thus separating completely the front shell from the rear shell and ejecting the front shell from the machine.

It is to be noted that when the front wedge 200 has been moved to its highest position, as hereinbefore explained, the nose 209 has entered the hole 208 in the lever 200 and locked same in its raised position.

When the offset 207 is moved into the position shown in Fig. 1, the end 212 of the lever 210 strikes the bracket 109 and removes said nose from said hole, thus permitting the wedge 200 to drop to the position shown in Figs. 7 and 8.

After the shucking knife 294 has severed the meat from the front shell of the oyster, the face 346 of the cam 343 allows the roller 243 and lever 239 to move upwardly owing to the pull of the spring 236. The upward movement of the lever 239 allows the bar 229 to be moved toward the right by the pull of said spring and the extension 264 bearing against the edge 347 formed in the bar 245 brings said bar and the shucking knife 294 to the positions shown in Figs. 4, 5 and 22.

When the extension 281 was moved toward the left, as before described, the left hand beveled edge 283 thereof struck the adjacent beveled edge of the pawl 270 and moved it to the position shown dotted in Fig. 26; consequently, when the bar 245 is moved back the face 276 of the dog 263 will strike against the face 279 of said pawl and said dog will be shifted to the position shown dotted in said figure.

When the bar 229 moves toward the right, as just explained, and the end of the extension 281 passes into the slot 301, the detent 297 drops into the position shown in Figs. 4 and 5. The roller 243 and lever 239 are then forced downwardly by the face 348 of the cam 343 and owing to the fact that the extension 266 is now in the position shown dotted in Fig. 26, the bar 244 and front shucking knife 256 will be moved toward the left. During the early part of the movement of said shucking knife toward the left, the face 324 strikes the face 325 and allows the pan 308 to move to the position shown dotted at 338 in Fig. 1, as hereinbefore explained, thus bringing said pan in position to catch the meat when the latter is severed from the rear shell.

The front shucking knife 256, the detent 296 and extension 292 continue their movement toward the left, the latter guiding the front edge of said knife on to the rear shell. This motion continues until said knife rests on said shell and then the front of the finger 302 strikes the incline 305 and lifts the left edge of the slot 300 from engagement with the extension 280 and the spring 290 then restores the detent 296, the bar 287 and extension 292 to the positions shown in Figs. 4 and 5. The front shucking knife 256 continues its movement toward the left and severs the meat from the rear shell and the former then drops into the pan 308. The face 349 of the cam 343 allows the roller 243 and lever 239 to move upwardly owing to the pull of the spring 236. The upward movement of the lever 239 allows the bar 229 to move toward the right by the pull of said spring and the extension 264 bearing against the edge 350 formed in the bar 244 brings said bar and the front shucking knife to the positions shown in Figs. 4, 5 and 6.

When the extension 280 was moved toward the left, as before described, the left hand beveled edge 282 thereof struck the adjacent beveled edge of the pawl 270, (the latter being then in the position shown dotted in Fig. 26), and moved it to the position shown by full lines in Fig. 26; consequently, when the bar 244 is moved back as just described, the face 277 of the dog 263 will strike against the face 279 of said pawl and said dog will be removed from the position shown dotted in Fig. 26 to the position shown by full lines in said figure.

Just before the rear shucking knife 256 reaches the limit of its left hand movement, the link 172 is moved rearwardly and the surfaces 174 and 175 are removed from contact with the top 177 of the slot 173 and at the same time, the face 351 of the cam 140 allows the roller 131 to move upwardly, thus allowing the front end of the lever 130 to be pulled downwardly by the spring 135. Downward movement of the front end of the lever 130 brings the bar 141 and rear wedge 144 downwardly and the bevel 170 strikes the bevel 169 and forces the bar 161 downwardly. The plate 153 also pulls against the collar 160 and forces the bar 155 downwardly, thus removing the holding means from the bottom of the rear oyster shell.

It will thus be noted that the rear shucking knife 294 severs the meat from the front shell and that the front knife 256 severs the meat from the rear shell. While the front shucking knife is returning, as just described, to the position shown in Figs. 4 and 5, the upper edge of the extension 280 passes into the slot 300 and allows the detent 296 to drop to the position shown in said figures.

During said motion of the front shucking knife the ram 43 is aprpoaching its forward position and the pan 308 is moving in a counter clock-wise direction and the offset 207 is also moving in a counter clockwise direction to prepare for the reception of the next oyster which has just passed over the hammers 89 and been notched thereby.

The pluralities of thin shucking knives 256 and 294 are used so that each knife may accommodate itself independently of the others to the irregularities of the oyster shells. Each knife is pressed against the shell by its spring.

It is to be borne in mind that the pan 308 is moving out in a counter clock-wise direction beyond the position shown by full lines in Fig. 1 and that the meat of the oyster which has just been shucked is resting in said pan. Consequently, during said motion of said pan, the attendant can determine the size of the oyster and direct it into the proper receptacle.

We claim:—

1. In an oyster shucking machine, the combination with a frame, a ram slidably mounted thereon and horizontal clamping levers pivoted on said ram for clamping an oyster, of means for hammering a notch in the shells of said oyster, and means for moving said ram to move said oyster past said hammering means.

2. In an oyster shucking machine, the combination with a frame, a ram slidably mounted thereon and horizontal clamping levers pivoted on said ram for clamping an oyster, of means for hammering a notch in the shells of said oyster, a vertical clamping lever pivoted on said frame and means for raising said lever, means for moving said ram to bring said oyster into position to be operated upon by said hammering means and to place said oyster under said vertical clamping lever, a spring attached to said vertical clamping lever and means for straining said spring to press said vertical clamping lever against said oyster.

3. In an oyster shucking machine, the combination with a frame, a ram slidably mounted thereon and horizontal clamping levers pivoted on said ram for clamping an oyster, of means for hammering a notch in the shells of said oyster, a vertical clamping lever pivoted on said frame, means for raising said lever, means for moving said ram to bring said oyster into position to be operated upon by said hammering means and to place said oyster under said vertical clamping lever, a spring attached to said vertical clamping lever, means for straining said spring to press said vertical clamping lever against said oyster, and means for releasing said horizontal clamping levers from said oyster.

4. In an oyster shucking machine, the combination with a frame, a ram slidably mounted thereon and horizontal clamping levers pivoted on said ram for clamping an oyster, a vertical clamping lever pivoted on said frame and means for raising said lever, hammering means, means for moving said ram to bring said oyster into position to be operated upon by said hammering means and to place said oyster under said vertical clamping lever, a spring attached to said vertical clamping lever, means for straining said spring to press said vertical clamping lever against said oyster, means for releasing said horizontal clamping levers from said oyster, and means for retracting said ram.

5. In an oyster shucking machine, the combination with a frame, a ram slidably mounted on said frame and means for moving said ram forwardly and backwardly, of horizontal clamping levers for clamping an oyster mounted upon said ram, spring pressed means for pressing said clamps against said oyster during the forward movement of said ram, a vertical clamping lever for clamping said oyster near the end of the forward movement of said ram and means for releasing said horizontal clamps from said oyster.

6. In an oyster shucking machine, the combination with a clamp for the lip end of an oyster, a clamp for the hinge end of an oyster, and an oyster clamped therebetween, of means for hammering a notch in the underside of said oyster, means for moving said oyster past said hammering means to notch said oyster, a fixed rib for entering said notch to guide said oyster and a second fixed rib between said first named rib and said clamp for the hinge end of said oyster.

7. In an oyster shucking machine, the combination with a frame, a ram slidably mounted thereon and horizontal clamping levers pivoted on said ram for clamping an oyster, of means for hammering a notch in the shells of said oyster, means for moving said ram to move said oyster past said hammering means, a guide for one of said levers, a spring pressed lever bearing against the second lever to firmly clamp said oyster while being operated upon by said hammering means, a spring pressed releasing lever also bearing against said second lever, means for releasing said clamping levers from said oyster when said levers are moved beyond the range of action of said guide and releasing lever, means for retracting said ram, slots in said guide and releasing lever, wings on said guide and releasing lever, and projections on said clamping levers located to strike said wings and be guided thereby through said slots, and spring pressed dogs to prevent the return of said projections through said slots.

8. In an oyster shucking machine, the combination with a frame, a holding lever pivoted thereon and means for moving said lever to clamp an oyster, of a pair of wedges, means for forcing said wedges between the shells of said oyster, means for separating said wedges to open said shells, means for severing the meat from the front one of said shells, means for further separating said wedges to remove said front shell from the rear shell and means for severing the meat from said rear shell.

9. In an oyster shucking machine, the combination with a frame, a holding lever pivoted thereon and means for moving said lever to clamp an oyster, of a pair of wedges, means for forcing said wedges between the shells of said oyster, means for separating said wedges to open said shells, means for severing the meat from the front one of said shells, means for further separating said wedges to remove said front shell from the rear shell, means for severing the meat from said rear shell and means for receiving said meat and delivering it over a receptacle.

10. In an oyster shucking machine, the combination with a frame, a holding lever pivoted thereon and means for moving said lever to clamp an oyster and means for hammering a groove in said oyster, of a pair of wedges, means for forcing said wedges between the shells of said oyster at said groove, and means for separating said wedges to open said shells.

11. In an oyster shucking machine, the combination with means for holding an oyster, of means for separating the shells thereof, means for severing the meat from one of said shells, means for removing said shell from the second shell, and means for severing the meat from the second shell, said means operating in the sequence named.

12. In an oyster shucking machine, the combination with means for holding an oyster, of means for separating the shells thereof, means for severing the meat from one of said shells, means for removing said shell from the second shell, means for severing the meat from the second shell, and means for receiving said meat and delivering it over a receptacle, said means operating in the sequence named.

13. In an oyster shucking machine, the combination with a shucking knife bar, of a plurality of thin shucking knives mounted thereon.

14. In an oyster shucking machine, the combination with a shucking knife bar, of a plurality of thin shucking knives pivotally mounted thereon side by side.

15. In an oyster shucking machine, the combination with a shucking knife bar, of a plurality of thin shucking knives mounted thereon and a guide for the cutting edges of said knives.

16. In an oyster shucking machine, the combination with a shucking knife bar, of a plurality of thin shucking knives mounted thereon, a guide for the cutting edges of said knives, and springs for keeping the cutting edges of said knives against said guide and against the shell of an oyster.

17. In an oyster shucking machine, the combination with a shucking knife bar, of a plurality of thin shucking knives mounted thereon, means for moving said bar to bring the cutting edges of said knives between the meat and a shell of an oyster and means for retracting said bar.

18. In an oyster shucking machine, the combination with means for holding an oyster, of means for separating the shells thereof, shucking knives, means for guiding the cutting edges of said knives between said shells, means for moving said knives to bring said edges between the meat and one of said shells, and means for retracting said knives.

19. In an oyster shucking machine, the combination with means for holding an oyster, of means for separating the shells thereof, shucking knives, means for guiding the cutting edges of said knives between said shells, means for retracting said guiding means, means for moving said knives to bring said edges between the meat and one of said shells, and means for retracting said knives.

20. In an oyster shucking machine, the combination with a frame and means for holding an oyster mounted on said frame, of means for separating the shells of said oyster, a front shucking knife bar, a rear shucking knife bar, shucking knives mounted on each of said bars, means for guiding the cutting edges of said knives between said shells, means for moving said rear bar to bring the cutting edges of the knives mounted thereon between the meat and the front shell, means for retracting said rear bar, means for moving said rear bar to bring the cutting edges of the knives mounted thereon between the meat and the rear shell, and means for retracting said rear bar.

In testimony whereof, we affix our signatures.

EDWARD LOUIS TORSCH.
JOHN LINDSAY SELLAR.